United States Patent [19]

Peterson et al.

[11] Patent Number: 4,953,689
[45] Date of Patent: Sep. 4, 1990

[54] CONVEYOR BELT CLEANER

[75] Inventors: Edwin H. Peterson; Harold M. Stetson, both of Neponset; Robert T. Swinderman, Kewanee, all of Ill.

[73] Assignee: Martin Engineering Company, Neponset, Ill.

[21] Appl. No.: 902,566

[22] Filed: Sep. 2, 1986

[51] Int. Cl.⁵ .................................. B65G 45/00
[52] U.S. Cl. .................... 198/497; 198/499; 15/256.51
[58] Field of Search ................ 198/497, 499; 15/256.51, 256.5

[56] References Cited

U.S. PATENT DOCUMENTS

| | | | |
|---|---|---|---|
| 1,543,411 | 6/1925 | Wittig | 198/499 |
| 1,880,002 | 9/1932 | White et al. | |
| 1,975,591 | 10/1934 | Sinden | 198/230 |
| 2,255,314 | 9/1941 | Graham | |
| 2,794,540 | 6/1957 | Sinden | 198/230 |
| 3,315,794 | 4/1967 | Ellington | 198/230 |
| 3,342,312 | 9/1967 | Reiter | 198/230 |
| 3,504,786 | 4/1970 | Matson | 198/230 |
| 3,529,315 | 9/1970 | Dunlap et al. | 15/256.51 |
| 3,656,610 | 4/1972 | McWilliams | 198/230 |
| 3,674,131 | 7/1972 | Matson | 198/230 |
| 3,782,534 | 1/1974 | Holleman | 198/230 |
| 3,913,728 | 10/1975 | Pott | 198/230 |
| 3,994,384 | 11/1976 | Reiter | 198/497 |
| 3,994,388 | 11/1976 | Reiter | 198/499 |
| 4,019,217 | 4/1977 | Schinke | 15/256.53 |
| 4,036,351 | 7/1977 | Reiter | 198/499 |
| 4,036,354 | 7/1977 | Reiter | 198/499 |
| 4,105,109 | 8/1978 | Schultz | 198/499 |
| 4,202,437 | 5/1980 | Gordon | 198/497 |
| 4,249,650 | 2/1981 | Stahura | 198/499 |
| 4,265,358 | 5/1981 | Veenhof | 198/499 |
| 4,344,525 | 8/1982 | Bancroft et al. | 198/499 |
| 4,489,823 | 12/1984 | Gordon | 198/499 |
| 4,533,036 | 8/1985 | Gordon | 198/499 |

FOREIGN PATENT DOCUMENTS

| | | | |
|---|---|---|---|
| 910834 | 9/1972 | Canada | 198/89 |
| 960990 | 1/1975 | Canada | 198/89 |
| 145186 | 5/1975 | Japan | |
| 1451759 | 10/1976 | United Kingdom | |

Primary Examiner—Joseph E. Valenza
Assistant Examiner—D. Glenn Dayoan
Attorney, Agent, or Firm—Lee, Mann, Smith, McWilliams & Sweeney

[57] ABSTRACT

A conveyor belt cleaner which includes a sleeve mounted over a transversely extending support member one or more cleaner elements with a mounting flange at one end for connection to the sleeve, a channel defined between the sleeve and the mounting flange, and a sliding surface associated with the sleeve formed of a plastic having a high degree of lubricity and a low sliding coefficient of friction, the sliding surface adapted to facilitate removal and replacement of the belt cleaner elements. A loose-running fit between mating parts is also provided.

14 Claims, 4 Drawing Sheets

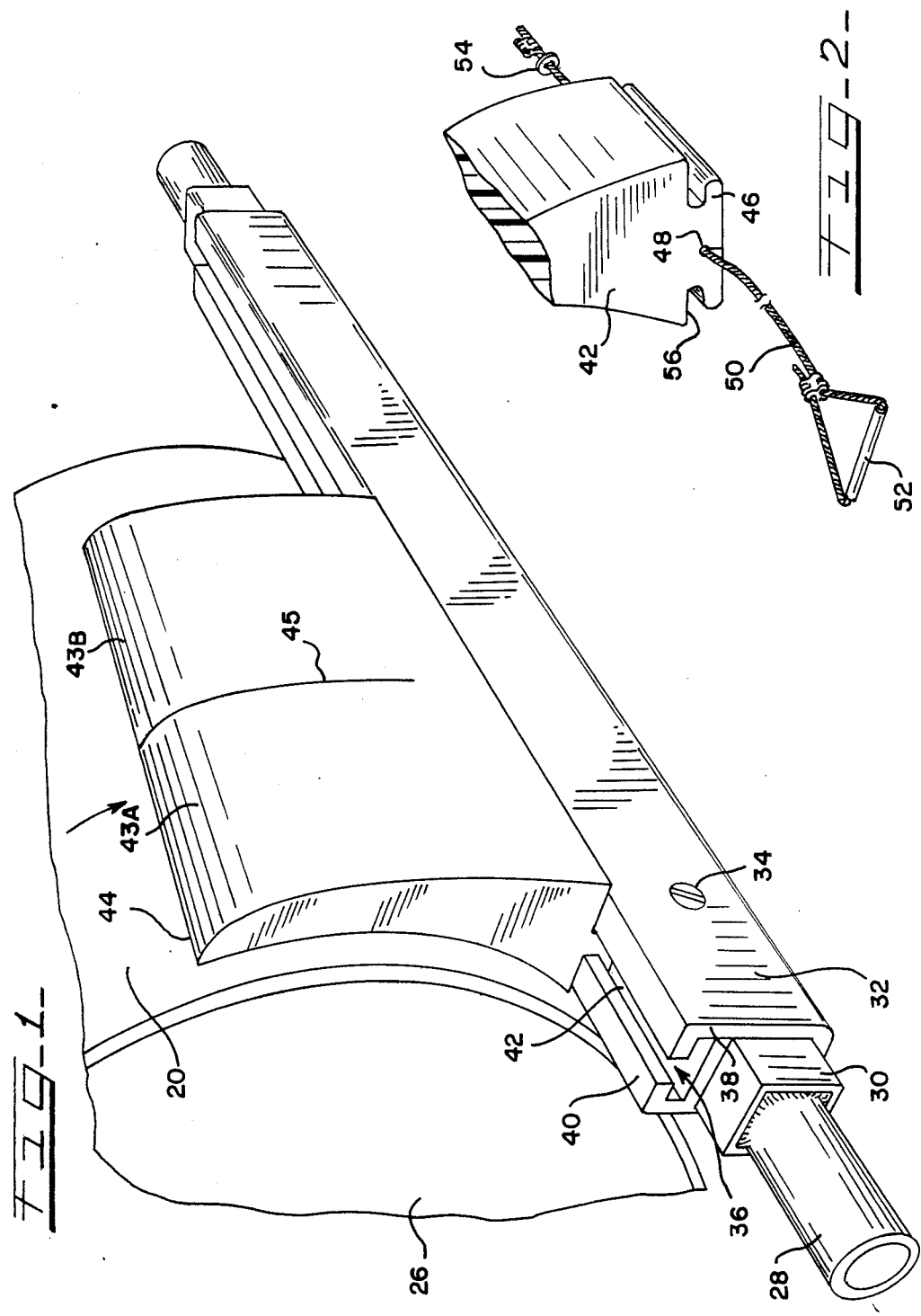

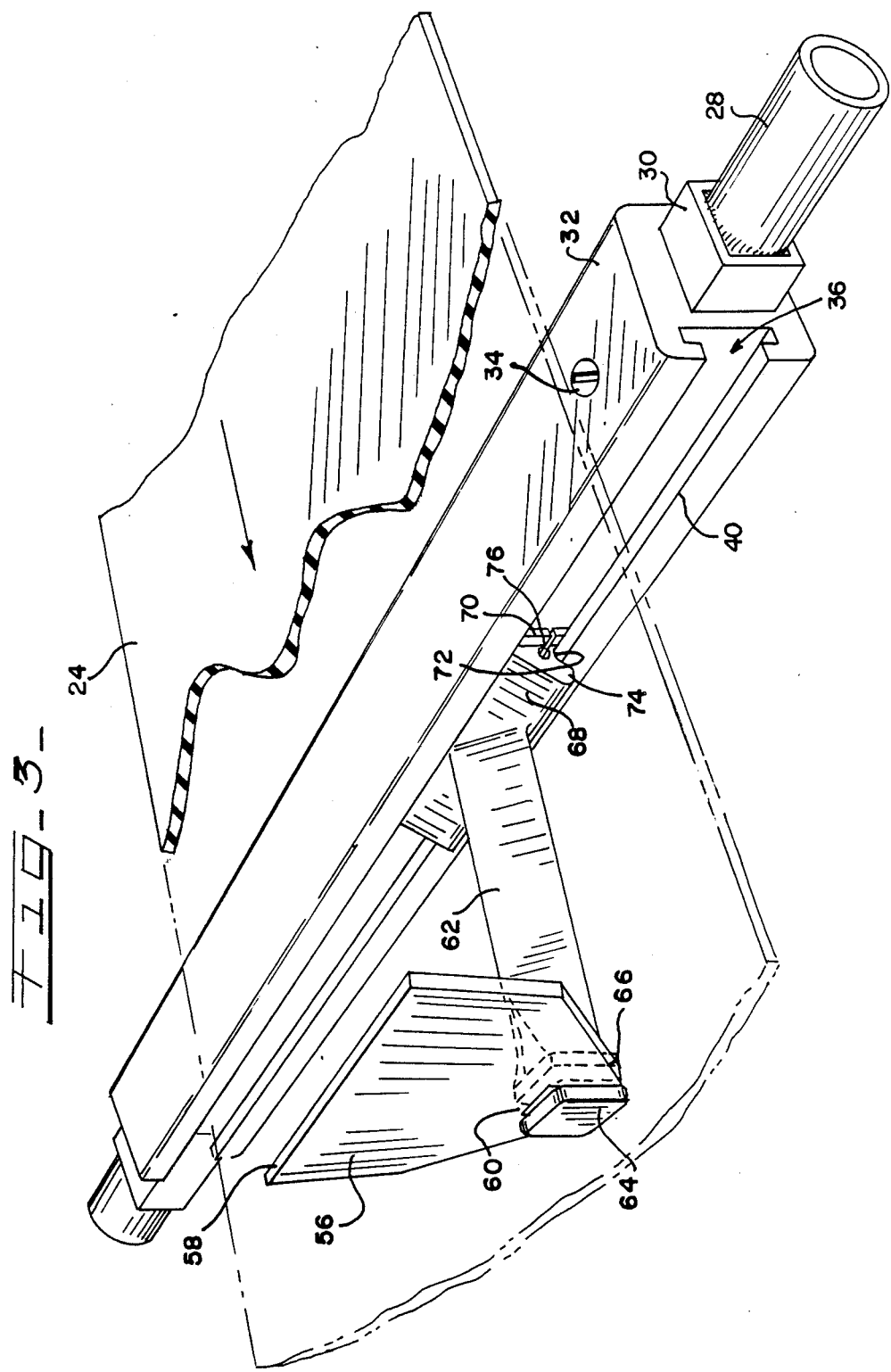
FIG-3-

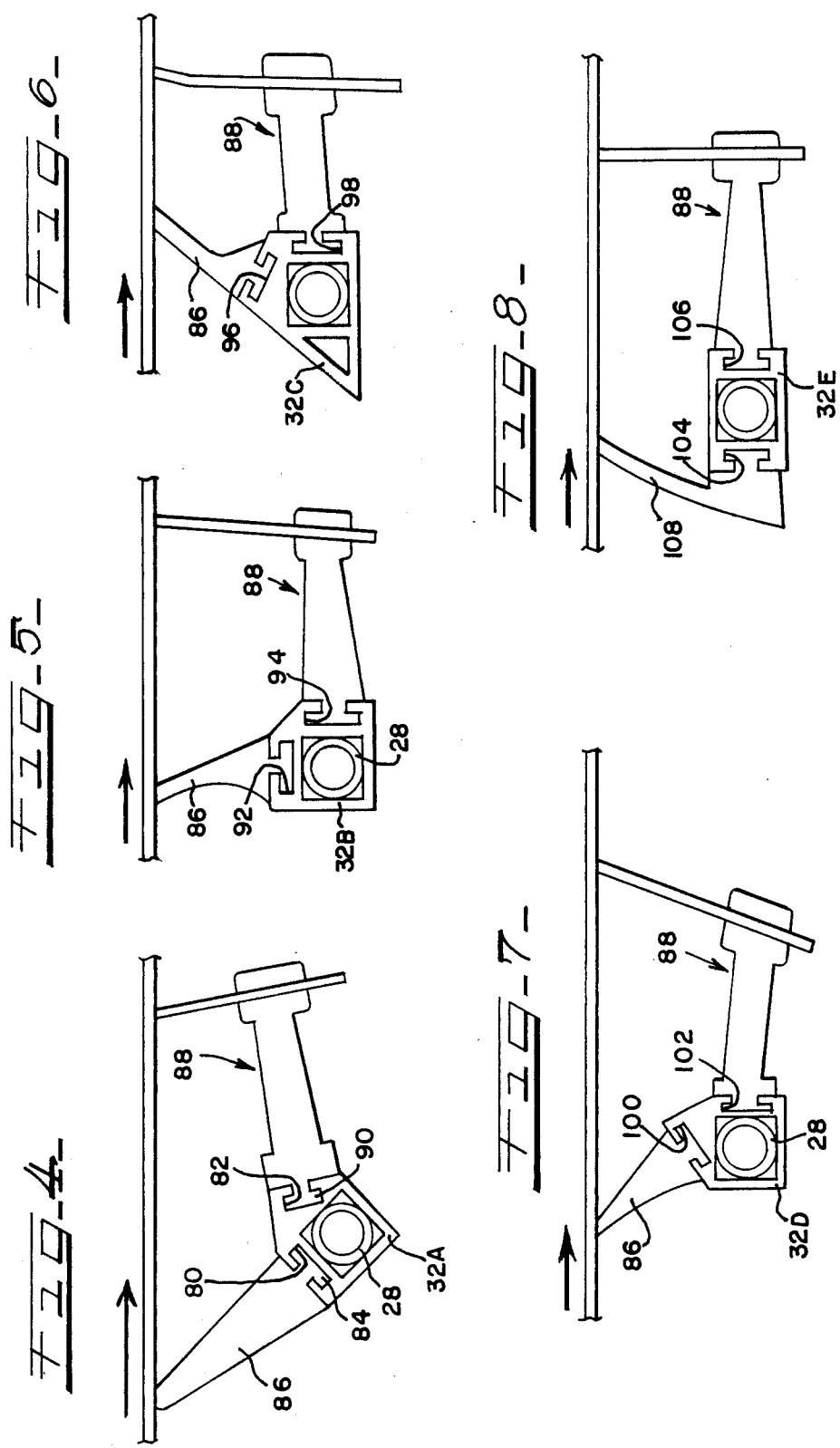

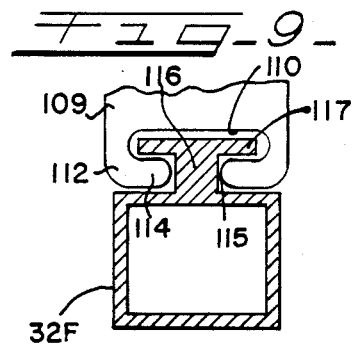
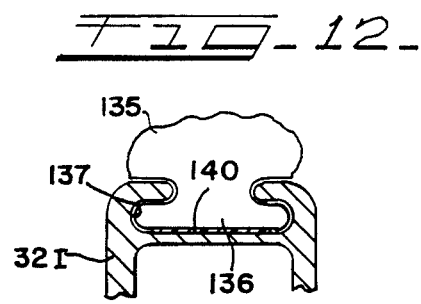
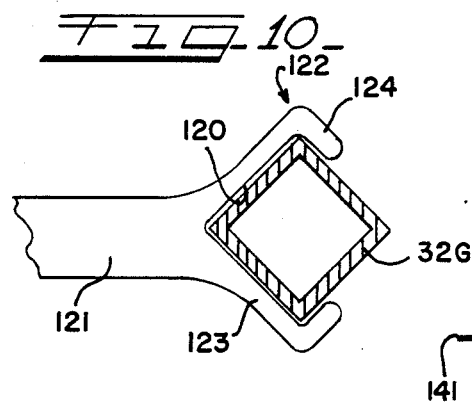
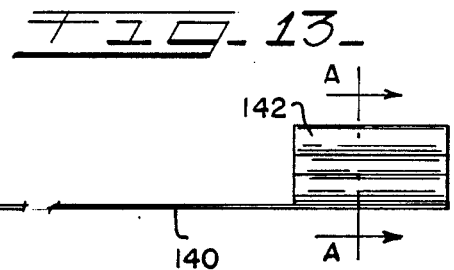
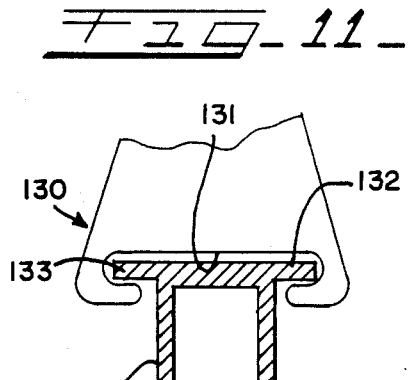
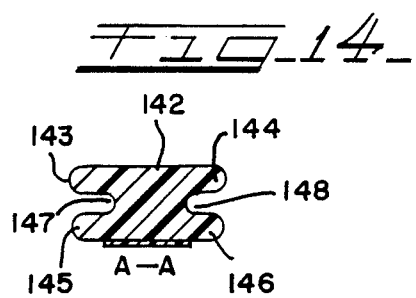

CONVEYOR BELT CLEANER

BACKGROUND OF THE INVENTION

The present invention is directed to a conveyor belt cleaner which is generally mounted underneath the return run of a conveyor belt for scraping residual material from the belt. One such arrangement is illustrated and described in U.S. Pat. No. 4,249,650 owned by the assignee of the present invention. That conveyor belt cleaner provides metal sleeve members slidably mounted on a metal shaft each of the sleeve members supporting a cleaner blade. While this arrangement has proven effective, difficulty has been encountered in some environments resulting in increased frictional resistance to sliding when the sliding surfaces are metal. In some instances, chemical bonding takes place between the metal parts causing the operator to exert an undue amount of force to restore the parts to their initial sliding engagement. The majority of prior art devices also feature an arrangement in which slight clearance is provided between sliding parts.

SUMMARY OF THE INVENTION

The present invention provides a conveyor belt cleaner with a greatly improved mounting arrangement for installation or removal of belt cleaner blades. The mounting arrangement of the preferred embodiment consists of a sleeve mounted over the transverse support member with a channel formed between the sleeve and a mounting flange on a cleaner element. The interior surface of the sleeve consists of a non-stick plastic with a high degree of inherent lubricity and a low sliding coefficient of friction. The individual belt cleaner elements may be formed with a mounting flange at one end which is shaped complementary to the sleeve and adapted to interfit with the channel for sliding engagement therebetween. A loose-running fit between the parts insures easy slidability in spite of the accumulation of dust and dirt.

DESCRIPTION OF THE DRAWINGS

FIG. 1 is a perspective view of the conveyor belt cleaner and mounting arrangement of the present invention.

FIG. 2 is a perspective view, partially broken away, showing the lower portion of one embodiment of a belt cleaner blade utilized in the present invention.

FIG. 3 is a perspective view, partially broken away, showing an alternative embodiment of belt cleaner blade and mounting arrangement.

FIG. 4 is a side view showing an alternative mounting arrangement.

FIG. 5 is a side view showing an alternative mounting arrangement.

FIG. 6 is a side view showing an alternative mounting arrangement.

FIG. 7 is a side view showing an alternative mounting arrangement.

FIG. 8 is a side view showing an alternative mounting arrangement.

FIG. 9 is a side view partially broken away of an alternate arrangement for mounting a doctor blade on a sleeve.

FIG. 10 is a side view partially broken away showing an alternate arrangement for mounting an arm and blade cleaner over a sleeve.

FIG. 11 is a side view partially broken away showing an alternate arrangement for mounting either an arm or a doctor blade over a sleeve.

FIG. 12 is a side view partially broken away showing an alternate arrangement for blade removal.

FIG. 13 is a side view showing only the blade removal mechanism of FIG. 12.

FIG. 14 is a side sectional view taken along the lines A—A in FIG. 13.

DESCRIPTION OF THE PREFERRED EMBODIMENT

FIG. 1 shows, in perspective, the discharge end portion of a conveyor belt 20. The belt 20 has an upper or delivery run and a lower or return run 24, the belt being trained about a drum or roller 26 conventionally carried in a frame (not shown).

A belt cleaner assembly is provided including a linearly extending support member 28 shown in the form of a circular rod or bar with a rectangular piece of structural steel or plastic tubing 30 mounted concentrically thereon. The tube 30 may be welded or otherwise fastened to the support 28. The wall thickness of the tube 30 can be varied and the outside dimensions of the preferred embodiment are 2 ½" square or can be metricated to 60 millimeters if preferred. The tubing adds substantial strength to the support, but is not needed under normal conditions. Mandrels (not shown) extending partially from each side or just from one side can be used instead of the support 28 for positioning and supporting the sleeve.

Mounted over the tube 30 is a sleeve 32. In the preferred embodiment, the entire sleeve 32 is formed of a non-stick plastic having a high degree of inherent lubricity and a low sliding coefficient of friction. One plastic which has been found to be successful is high density polyethylene. Use of this material enables the entire track section to be extruded. Another plastic material which is acceptable is ultra high molecular weight polyethylene which exhibits greater abrasion resistance and has a lower sliding coefficient of friction than high density polyethylene. While the strength characteristics of the two plastics are approximately the same, the processing of the ultra high molecular weight polyethylene is more difficult. Both plastics have an inherent lubricity due to the waxy nature of the polyethylene plastic. Both are fairly rigid but exhibit an ability to absorb impact and demonstrate a high resistance to chemical reaction which is important in the contaminated environment in which many conveyor belts operate. Any of a number of other non-stick plastics exhibiting a high degree of inherent lubricity may be used successfully so long as the plastic has a sliding coefficient of friction falling within the range of between about 0.05 and 0.5, with the optimum performance being found at the low end of the range. One advantage of utilizing a sleeve which consists entirely of non-stick plastic is the ready slidability which is provided between the interior of the sleeve and the exterior of the tube. The sleeve 32 is shown as being rectangular in shape and entire'y surrounding the tube 30, but other non-continuous sleeve arrangements could be substituted. For example, the sleeve could be C-shaped or U-shaped with inwardly extending legs.

The sleeve 32 may be connected to the tube 30 by a fastener 34 or any of a number of other methods. Such a connection secures the sleeve 32 against relative movement along the tube 30 during normal operation but permits removal of the sleeve when necessary. The interior dimensions of the sleeve 32 and the exterior dimensions of the tube 30 are sized so as to provide a "loose-running" fit between these elements. This classification of fit is defined in most engineering handbooks and is designed to provide easy sliding of the parts with respect to each other even in the face of the accumulation of dust and dirt.

The sleeve 32 illustrated in FIGS. 1 and 3 defines one embodiment of the invention consisting of a T-shaped track or channel 36 formed on one of its exterior surfaces. The track 36 is formed by a pair of legs 38 which extend upwardly from the exterior of the sleeve 32 and a pair of legs 40 which extend inwardly from the legs 38. A gap 42 is defined between the inner ends of legs 40.

Although the preferred embodiment has been described as utilizing a sleeve 32 composed entirely of a non-stick plastic having a high degree of inherent lubricity and a low sliding coefficient of friction, it is also possible to utilize a sleeve having a core composition of different material with a channel having an interior surface of non-stick high lubricity plastic. Such a construction could be accomplished with a sleeve 32 of metal having the interior surface of the track 36 coated with a plastic having the requisite physical properties discussed herein. Alternatively, a separate plastic insert could be provided in the channel to accomplish the same result. The all-plastic sleeve construction provides a definite weight advantage since it is substantially lighter in weight than a metal sleeve.

The environment in which conveyor belt cleaners operate must be understood in order to appreciate the significance of the substantial advantages provided by the present invention. In many instances, the cleaner operates under a belt which is carrying coal or wet cementitous material or any of a number of products which produce a dusty and dirty environment. Material falls from the conveyor belt in all directions. In such environments, the air and all cleaner parts are saturated with submicronic particles which penetrate all mating surfaces no matter what efforts are made to shield and protect. The loose running fit between sliding parts and the non-stick properties of the plastic sliding surface are used to greatly reduce the adherence and buildup of contaminants on the mating parts, thereby improving the slidability of the components and greatly facilitating the removal and replacement of cleaner blades. Use of the non-stick plastic surface eliminates the phenomenon of the chemical bonding which occurs in prior art devices between mating metal parts. Slight amounts of vibration are sufficient to effect removal of contaminants from the plastic surface of the present invention.

FIG. 1 illustrates the sleeve 32 oriented with the channel 36 on its uppermost face which orientation is appropriate for the doctor blade type of belt cleaner shown in FIG. 1. In FIG. 3, the sleeve 32 is oriented such that the channel 36 is disposed on the lefthand side which orientation is appropriate for an arm and blade cleaner in which the belt is moving in the direction illustrated by the arrow. If the belt is moving in the other direction or if an orientation which is the reverse of that illustrated in FIG. 3 is desired, the sleeve 32 can be mounted with the channel 36 disposed on the righthand face, rotated 180° from the orientation shown in FIG. 3.

The doctor blade cleaning arrangement shown in FIG. 1 includes a plurality of adjacently mounted belt cleaner elements, here shown as cleaner blades 43, which contact the belt 20 and scrape residual material from the outer surface. The embodiment of FIG. 1 shows individual blade elements 43A and 43B joined at their base, but separated along line 45 to allow better conformity of individual blade members to the surface being scraped. The blade illustrated in FIGS. 1 and 2 is preferably composed of molded plastic. The cleaner element can be supplied either with individual segments, as illustrated, or as a complete, one-piece blade, which extends substantially the entire width of the belt to be cleaned. The preferred material for the doctor blade composition is 60 Shore D polyurethane or 90 Shore A polyurethane if the belt has mechanical splices.

The blade 43 is formed with a scraping edge 44 at one end and a mounting flange 46 disposed at its lower end. Other mounting arrangements can be used to secure the blade 43 to the sleeve 32. The mounting flange 46 is T-shaped and is formed to fit within the channel 36 with liberal clearance between the parts. This optimum fit is continuously referred to herein as a "loose-running" fit. The geometry of the mounting arrangement prevents misalignment, and the loose-running fit allows continued effective slidability of mating parts even in the contaminated environment in which most conveyor belt cleaners operate. The combination of the plastic sliding surface and the loose-running fit between mating parts provides an unexpected and substantial increase in performance.

FIG. 2 shows one embodiment of a cleaner element removal arrangement in which an aperture 48 is provided in the base of blade 43, which aperture extends through the entire width of the blade. A flexible cable 50 extends through the aperture 48. A handle 52 is provided on one end of the cable which extends through as many blades 42 as are utilized in the scraping arrangement. A stop 54 is provided at the other end of the cable to engage the side of the outermost blade 42. In this embodiment, the cable 50 consists of a wire rope approximately ⅛" in diameter which is used as a lanyard to remove the blades from the track when replacement is desired. Placement of the lanyard at the center lines of the interface between the sliding sleeve element and the cavity or gap 42 eliminates the tendency to tip the blades and bind them in the track. The lower edges 56 of the doctor blade 43 overlie the upper surfaces of inwardly extending legs 40. When adjacent blades are abutted against each other for operation, the channel 36 in which the blades slide is sealed against the entry of contaminants.

Illustrated in FIG. 3 is a conveyor belt cleaner with a cleaning element of the arm and blade type. The cleaner includes the support 28, tube 30 and sleeve 32 common with the embodiment of FIG. 1. As previously described, the sleeve 32 is oriented with the channel 36 on its lefthand face. The arm and blade cleaner includes a blade 56 with a scraping edge 58 at its upper end. At its lower end, the blade 56 defines a notch 60 which can be "snap-fit" over one end of arm 62 between flanges 64 and 66. The arm 62, shown in FIG. 3, is triangular in cross-section and extends from a mounting flange 68. Other geometric shapes for the arm 62 can be utilized. The flange includes a base section 70 of rectangular shape adapted to fit within the channel 36 for sliding engagement. A groove 72 is formed in the flange 68 to slide along the inner edge of leg 40 and a lip 74 overlies the surface of leg 40 to assist in sealing the channel.

In one embodiment, the arm 62 and flange 68 are cast as a single element from 90 shore A urethane. In the embodiment shown in FIG. 3, there is provided a separate mounting flange 68 for each arm 62. It is also within the purview of the present invention to provide a single flange (not shown) which extends the entire width of the channel from which a plurality of arms extend. The triangular configuration of the arm 62 assists in shedding material. The lengths of adjacent arms can be arranged to alternately provide long and short arms with a slight amount of blade overlap to ensure complete cleaning of the belt surface.

Alternatively, adjacent arms may be of the same length resulting in cleaner blades which are adjacent to and abut each other. The blade 56 can be cast as an integral part of the arm or can be removable, from the arm as illustrated in FIG. 3. The removable blade 56 can be formed of various materials including plastic, metal or a ceramic substance providing for the utilization of different composition blades for different environments and belt compositions. As shown in FIG. 3, the base section 70 extends outwardly at one end and is adapted to overlap a complementary section formed on the engaging side of the adjacent mounting flange. This arrangement seals the interior of the channel 36 against the entry of contaminants. An aperture 76 is provided through the mounting flange 68 for the same purpose as the aperture 48 illustrated in FIG. 2 and previously described herein.

FIGS. 4 through 8 illustrate various modified embodiments which include a plurality of mounting channels formed in outer surfaces of the sleeve. FIG. 4 shows a mounting sleeve 32A mounted over support member 28. The sleeve 32A includes a first channel 80 defined on one outer surface and a second channel 82 defined on another outer surface. The channel 80 has a central axis which is parallel to the central axis of the support 28 while the central axis of the channel 82 is disposed at an angle to the central axis of the support 28. Disposed within the channel 80 is the mounting flange 84 of a doctor blade type cleaner blade 86. An arm and blade type cleaner element 88 includes a mounting flange 90 disposed within the channel 82. Such an arrangement utilizes the doctor blade 86 as a precleaner with the arm and blade element 88 providing a final cleaning operation when the belt is running in the direction indicated by the arrow in FIG. 4. Such an arrangement can be vertically tensioned by an adjustment mechanism (not shown) which moves the support member closer to the surface of the belt thereby increasing the engaging force of both the doctor blade 86 and the arm and blade element 88.

The embodiment shown in FIG. 5 includes a sleeve 32B which defines a pair of channels 92, 94 in two of the outer faces thereof which lie 90° apart from each other. A doctor blade type cleaner blade 86 and an arm and blade element 88 are shown mounted in the respective channels 92, 94. Such an arrangement lends itself to radial tensioning in which the support member is rotated about its central axis until the proper degree of tensioning is achieved.

FIG. 6 illustrates an embodiment in which both the doctor blade 86 and the blade of the arm and blade element 88 are inclined at an angle toward the direction of conveyor belt travel. A sleeve 32C defines mounting channels 96 and 98.

FIG. 7 shows an embodiment in which the precleaner 86 is inclined at an angle opposite the direction of belt travel with the arm and blade element 88 inclined toward the direction of belt travel. This arrangement includes a sleeve 32D which defines mounting channels 100 and 102 on two outer faces thereof.

The embodiment of FIG. 8 includes a sleeve 32E defining mounting channels 104 and 106 on faces which are disposed 180° apart. A modified form of doctor blade precleaner 108 is mounted on the lefthand side in channel 104 and an arm and blade element 88 is mounted on the righthand side in channel 106. All of the mounting channels 80 and 82, 92 and 94, 96 and 98, 100 and 102 and 104 and 106 of the embodiments illustrated in FIGS. 4 through 8 include, as an essential element thereof, an interior surface of nonstick plastic providing a high degree of inherent lubricity and a sliding coefficient of friction of between approximately 0.05 and 0.5. All of these embodiments feature a dual cleaning system including a precleaner and a secondary cleaner mounted on a single sleeve with multiple mounting channels formed on exterior surfaces.

In the embodiments shown in FIGS. 1 through 8, the channel has been defined in the outer surface of the sleeve 32. It is to be contemplated, however, that with a reversal of parts, the benefits of the present invention can also be obtained. FIGS. 9 through 11 illustrate modified embodiments in which the channel is formed in the mounting flange of the blade or the arm, as opposed to the channel being formed in the sleeve as illustrated in the embodiments of FIGS. 1 through 8. FIG. 9 discloses an embodiment in which the lower portion of a doctor blade 109 is illustrated. The blade 109 defines a channel 110 which is approximately the mirror image of the channel 36 shown in FIG. 1. It consists of a T-shaped track formed by a pair of downwardly extending legs 112 and a pair of inwardly extending legs 114. A gap 115 is defined between the inner ends of the legs 114. The sleeve 32F is formed of the same nonstick, high lubricity plastic as previously disclosed. Formed on its upper edge is an upwardly extending member 116 with a flat flange 117 disposed on its upper end. The T-shaped male member formed by 116, 117 is adapted to interfit in the slot 110 with sufficient clearance so as to afford a loose-running fit. The doctor blade 109 can also be formed of a non-stick plastic having a high degree of inherent lubricity and a low sliding coefficient of friction resulting in a plastic-on-plastic sliding engagement. Thus, a channel defined between the sleeve and the mounting flange can alternatively have the channel defined in the sleeve or in the mounting flange with equally effective results. The plastic sliding surface can be located in the channel or on the mounting flange or, for optimum results, both the channel and the flange may include a plastic sliding surface. It is also within the purview of the present invention to locate the plastic sliding surface between the support 28 and the sleeve 32 to provide for rapid and easy slidability of the sleeve off of the support under some circumstances.

FIG. 10 illustrates an embodiment in which a channel 120 is formed in the end of an arm 121 of an arm and blade cleaner. A plastic sleeve 32G is shown comprised of the same type of plastic previously disclosed. The arm 21 defines a mounting flange 122 consisting of a pair of outwardly angled legs 123 and a shorter pair of legs 124 disposed at 90° to the legs 123. When both the arm 121 and the sleeve 32G are formed of the appropriate plastic as previously disclosed, a plastic-on-plastic sliding engagement is provided.

FIG. 11 illustrates one further embodiment which is appropriate either for a doctor blade or an arm and blade cleaner element. A mounting flange 130 is defined on either the bottom of a doctor blade or the inner end of an arm. A channel 131 is formed in the mounting flange. A sleeve 32H is illustrated which is rectangular in cross-section, but includes a flange consisting of a pair of outwardly extending ears 132, 133 disposed on top of the sleeve and extending outwardly therefrom. As illustrated, the ears form a flange adapted to be slidably received with loose-running clearance between the sleeve 131 and the flange formed by 132, 133 for sliding engagement.

FIGS. 12, 13, and 14 illustrate an alternative blade removal arrangement to that shown in FIG. 2. FIG. 12 illustrates the lower portion of a doctor blade 135 including a mounting flange 136 designed to slide within a channel 137 defined in an outer portion of sleeve 32I. As best illustrated in FIG. 13, a flat, thin plastic lanyard 140 is provided with a handle 141 at one end thereof and a molded plastic puck 142 at the other end. The lanyard is preferably formed of the same type plastic as the channel 137, but may also be formed of metal or cloth. In practice, a plastic strip approximately 1/16 inch thick and one inch wide has been utilized with successful results. The puck 142 is illustrated in cross-section in FIG. 14. It consists of a pair of upper legs 143, 144 and a pair of lower legs 145 and 146 defining a pair of grooves 147 and 148 therebetween. The puck 142 serves as a stop and is designed to engage the outermost side of a belt cleaner device when the lanyard 140 is pulled. The puck is sized so as to provide an interference fit in the channel 137 and serves to completely clean any debris from the channel when pulled through it for removal and replacement of the blades.

Thus, it has been shown that the present invention provides a belt cleaning arrangement in which mounting and removal of belt cleaning elements has been greatly simplified. The force required for removal of cleaning blades, when replacement is necessary, has been greatly reduced by providing a sliding surface of plastic with a high degree of lubricity and a corresponding low coefficient of friction operating with loose-running fits between parts of the belt cleaner which slide in and out to effect removal and replacement of the cleaner blades.

Various features of the invention have been particularly shown and described in connection with the illustrated embodiments of the invention. However, it must be understood that these particular arrangements merely illustrate and that the invention is to be given its fullest interpretation within the terms of the appended claims.

What is claimed is:

1. A conveyor belt cleaning arrangement including support means positioned to support belt cleaner elements, a sleeve member mounted on said support means and selectively connectable thereto, one or more belt cleaner elements each having a scraping edge at one end thereof for engaging said conveyor belt and each having mounting means at the other end thereof for connecting said element to said sleeve member, wherein said sleeve member is formed of a plastic having a high degree of lubricity and a low sliding coefficient of friction, said sleeve member defining a plastic sliding surface adapted to facilitate removal and replacement of said cleaner elements.

2. A conveyor belt cleaning arrangement as in claim 1 including a channel defined between said sleeve and said mounting means, said plastic sliding surface being disposed on the interior of said channel, said channel adapted to interfit with said mounting means for sliding engagement therebetween.

3. A conveyor belt cleaning arrangement as in claim 2 in which said mounting means includes a mounting flange formed on one end of said cleaner element.

4. A conveyor belt cleaning arrangement as in claim 2 in which said channel is defined in an outer surface of said sleeve.

5. A conveyor belt cleaning arrangement as in claim 2 in which said channel is defined in said mounting means.

6. A conveyor belt cleaning arrangement as in claim 2 in which said mounting means is also formed of plastic providing a plastic-on-plastic sliding engagement between said mounting means and said channel.

7. A conveyor belt cleaning arrangement as in claim 2 in which said sleeve member is formed of polyethylene.

8. A conveyor belt cleaning arrangement as in claim 2 including a plurality of channels each defined in an outer surface of said sleeve member, each channel defining an interior surface of plastic providing a high degree of lubricity and a low sliding coefficient of friction.

9. A conveyor belt cleaning arrangement as in claim 1 in which said plastic sliding surface has a sliding coefficient of friction of between about 0.05 and 0.5.

10. A conveyor belt cleaning arrangement as in claim 3 including a plurality of adjacently disposed cleaner elements in which said mounting flange on said cleaner element includes sealing means on at least one side thereof adapted to sealingly engage said mounting flange of said adjacent cleaner element to effect a seal therebetween and to block entry of contaminants into said channel.

11. A conveyor belt cleaning arrangement as in claim 7 including a plurality of adjacently disposed cleaner elements each defining a linearly extending aperture therethrough disposed toward the bottom of said element and cable means extending through said aperture and adapted, when pulled in a given direction, to urge said elements to slide along and out of said channel.

12. A conveyor belt cleaning arrangement as in claim 1 in which said cleaner element is formed of urethane plastic.

13. A conveyor belt cleaning arrangement as in claim 3 including a flexible strip disposed between said channel and said mounting flange with a handle at one end and a stop at the other end, said flexible strip operative to remove said cleaner elements from said channel.

14. A conveyor belt cleaning arrangement as in claim 3 in which said mounting flange and said channel are sized to provide a loose-running fit therebetween sufficient to maintain alignment between the parts but to allow ready slidability of said flange within said channel in contaminated environments.

* * * * *